Nov. 14, 1939. C. A. THURSTON Re. 21,267
METHOD OF SHAPING HEEL PARTS OF SHOE UPPERS
Original Filed Nov. 10, 1937
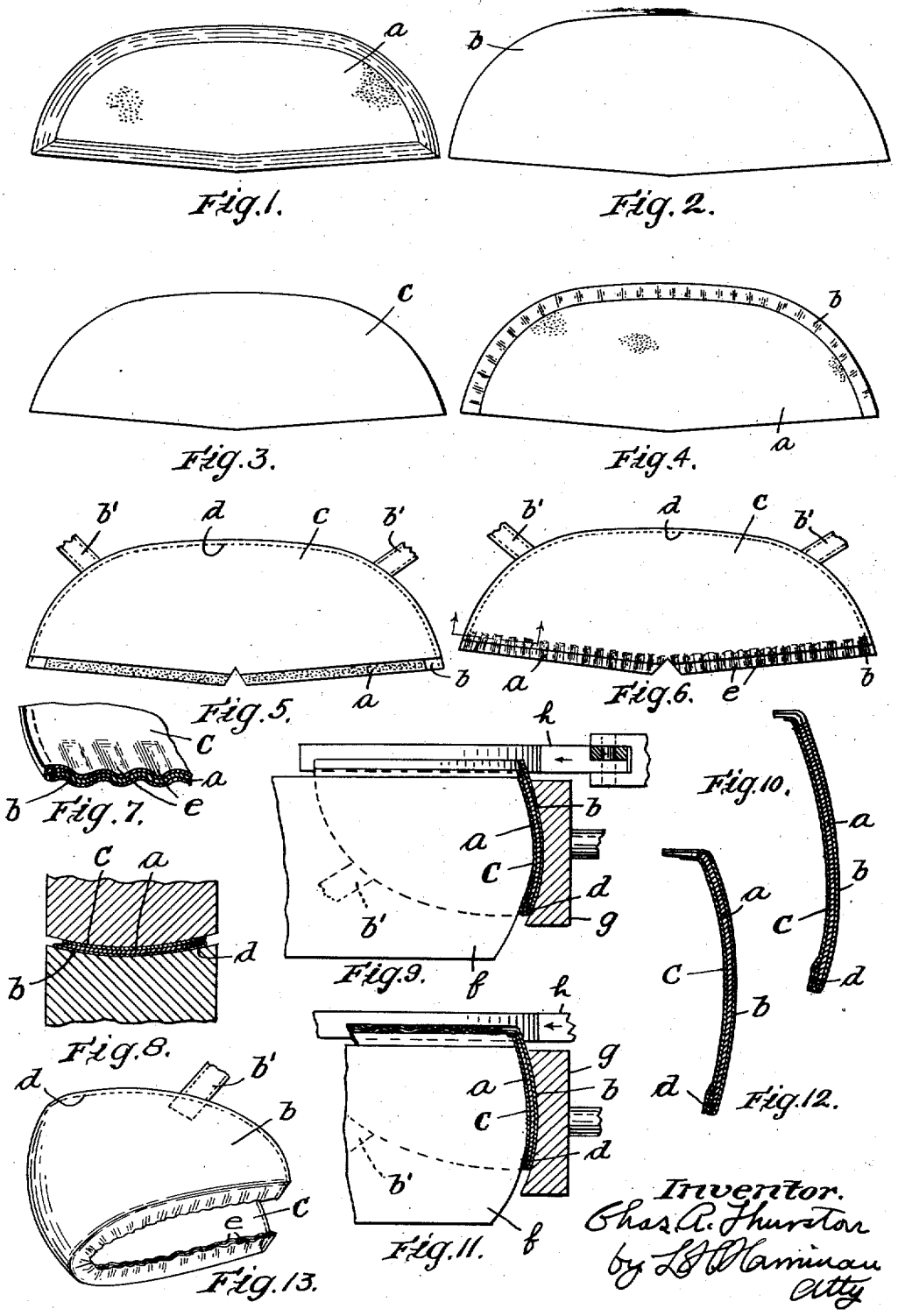
Inventor.
Chas. A. Thurston
by L. B. Harrington
Atty Reissued Nov. 14, 1939

Re. 21,267

UNITED STATES PATENT OFFICE 21,267

METHOD OF SHAPING HEEL PARTS OF SHOE UPPERS

Charles A. Thurston, Haverhill, Mass., assignor to John W. Herlihy, Wm. W. Herlihy, and John J. Herlihy, all of Haverhill, Mass., doing business as Lowell Counter Co., Lowell, Mass.

Original No. 2,145,410, dated January 31, 1939, Serial No. 173,763, November 10, 1937. Application for reissue September 20, 1939, Serial No. 295,807

5 Claims. (Cl. 12—146)

This invention relates to methods of shaping the heel portion of the upper of a shoe, whether employed in connection with a shoe of the sandal, or open shank type, in which the heel part is only connected to the forepart of the upper thru the sole, or whether it is directly connected to the forepart.

Prior to my invention the customary method of forming the heel part of the upper has been to stitch the upper leather and lining together at their top edges and then, when the shoe is lasted, to insert a previously moulded counter, or heel stiffener between the upper and lining and then to last the upper and lining onto the counter either by means of a lasting machine, or by hand.

The results then secured while sufficient with some types of shoes, have never been satisfactory with other types, particularly where a flat heel seat is especially desirable and when the sole is attached by a cementing process. Also the counter is often not correctly positioned between the lining and upper and the folds which are necessarily formed in the flanged portions of the upper and lining are often uneven and pressed into bunches.

I have attempted to obviate these difficulties by molding the lining, counter and upper leather together in an ordinary counter molding machine, so that a heel part would be produced which could be placed in position on the last and did not require the usual lasting operation, but, in attempting to do this, various difficulties were encountered, which principally consisted in the difficulty of avoiding damage to the upper, which is either of leather, or textile material, and in preventing the formation of wrinkles, or creases therein.

It was also practically essential that this operation be performed without increasing the manufacturing cost and very desirable that an actual reduction in manufacturing cost be secured.

The objects of my invention are to produce a method whereby the unmolded heel parts consisting of the lining, counter and upper may be assembled and then molded in an ordinary counter molding machine, so that they are shaped in their ultimate form, without causing damage to, or forming wrinkles in the upper, whereby the heel part thus produced may be placed on the last and attached to the sole without the necessity of performing a lasting operation, and resulting in producing improved results in shoe making at a reduced manufacturing cost.

I accomplish these objects by means of the hereinafter described method, which may be outlined as follows:

A flat counter piece, having skived edges, and suitably shaped upper and lining pieces are provided, between which the counter, while in temper, is placed, a flexible adhesive being interposed between each side of the counter and the upper and lining respectively, and the top edges then being stitched. When correctly positioned, the top and bottom edges of all three pieces are substantially coincident, so that the upper and lining overlap the portion of the counter from which the bottom flange is formed. The bottom edge portions of the upper, lining and counter are then crimped and the parts thus assembled are preferably "clam shelled" or rolled to produce a slight longitudinal and transverse curvature therein. The molding operation is then performed in an ordinary counter molding machine, which is so arranged that, by a preliminary operation, a partial bottom flange is formed and by a second operation the normal bottom flange is formed, the sides being at the same time molded in the ultimate form to correspond to the last on which the shoe is to be constructed.

For a more complete disclosure of the invention reference is now made to the following specification, in connection with the accompanying drawing in which:

Figs. 1, 2 and 3 are plan views of the counter, upper and lining pieces respectively.

Figs. 4 and 5 illustrate successive steps in the assembling operation.

Figs. 6 and 7 illustrate the result of the crimping operation.

Fig. 8 illustrates the clam shelling operation.

Figs. 9, 10, 11 and 12 illustrate steps in the molding operation.

Fig. 13 is a perspective view of the finished part.

While the method herein described is the same whether a vamp section is directly attached to the heel part or not, the various steps are preferably illustrated in connection with a heel part which is not directly connected to the vamp.

Suitably shaped counter, upper and lining pieces *a*, *b*, and *c* are provided, as shown in Figs. 1, 2 and 3 respectively, the counter being flat and having its edges skived. The counter is tempered and both sides are coated with a flexible adhesive, a form of rubber adhesive being employed which is waterproof and preferably non-drying or slow setting. While several methods of assembling these parts may be employed the following is considered preferable.

The adhesively coated counter, while in temper, is placed in position on the upper and the top edge portion of the latter is bent over the top edge of the counter and onto its inner side, as shown in Fig. 4. Then the lining piece *c* is placed in position on the inner side of the counter, so that it overlaps the inturned edge of the upper and so that its edpe is flush with the edge of the counter, as shown in Fig. 5. The top edges of the parts, as thus assembled, are stitched together by a row of stitches *d* close to the top edge, the stitches passing thru the edge portion of the counter, as shown in Figs. 10 and 12.

As thus assembled the counter will be correctly positioned with relation to the other parts and the bottom edge portions of the upper and lining will, to an extent, overlap the bottom edge portion of the counter, from which the bottom flange is subsequently formed. The bottom edge of the upper is preferably coincident with the bottom edge of the counter and the bottom edge portion of the lining preferably overlaps approximately one-half of the portion of the counter from which the bottom flange is subsequently formed, as shown in Fig. 12. At the time the stitching operation is performed, straps *b'*, or other holding means, will usually be attached.

The bottom edge portions of the three pieces as thus assembled are then crimped by forming a regular series of oppositely and transversely disposed indentations *e* therein, as indicated at Figs. 6 and 7. This crimping operation has the effect of binding all the edge portions together and is confined to the portion which forms the bottom flange by the subsequent molding operation. The parts are then "clam shelled" so as to curve them slightly longitudinally and transversely, as indicated in Fig. 8, by passing them between transversely curved rolls. This operation, while not wholly essential, is desirable.

By the next operation the assembled parts are placed in an ordinary counter molding machine indicated by the molding members *f* and *g*. An initial molding operation is first performed by setting the parts in such a position between the molding members that the bottom edge portion from which the flange is formed extends only partly beyond the face of the inner mold member *f*, as indicated in Fig. 9, so that, when the wiping member *h* performs its function, the bottom flange will only be partly formed, as indicated in Fig. 10. The sides and back of the parts are also preliminarily molded by this operation.

The parts are then moved out into the final molding position shown in Fig. 11, and a second and final molding operation is performed, so that the bottom flange is completely formed, as indicated in Fig. 12, and the entire shaping operation will be completed as shown in Fig. 13. This latter operation is preferably repeated to set the parts in molded form.

The part thus produced may then be placed in position on the last and no lasting operation at the heel end will be necessary, as the part is then ready for attachment to the sole.

When the parts, as originally assembled, are bent transversely to permit them to be placed in a molding machine and when the molding operation is performed, a substantial strain is placed on the upper lengthwise thereof, and, if the upper has been attached to the counter by an adhesive which does not yield, the upper is liable to be split crosswise, usually at the middle of the back, where the strain is greatest. For this reason the adhesive which is employed between the upper and counter is flexible and adapted to yield under strain. A non-drying, or slow setting rubber adhesive is preferably employed for this purpose, so that the longitudinal strain on the upper is distributed throughout the length of the counter and a slight relative movement of the upper on the counter is permitted when the parts are bent.

The crimping operation which is performed on the flange or bottom edge portions of the parts is of great importance for several reasons. It acts to connect these parts so as to prevent relative displacement at this portion, and when the wiping operation is performed to form the bottom flange, the folds which are formed in this portion of the upper will be uniform. Otherwise there would be liability of formation of these folds in bunches which would tend to prevent the formation of a flat heel seat and would be liable to cause creases to extend into the side of the upper beyond the vertex of the bend. The strain on the parts during the formation of the flange is also reduced thereby.

The progressive formation of the bottom flange described is also important, as the strain on the parts is also reduced thereby. The extent to which the counter is tempered is important, as I have ascertained that a medium temper enables the best results to be produced. The counter is tempered before the adhesive is applied, so that by coating it with a rubber adhesive the moisture is retained until after it has been molded.

While the upper and lining have been shown to correspond in shape to the contour of the counter, it will be understood that the end portions of the upper and lining may be extended beyond the ends of the counter without in any degree affecting the operations hereinbefore described, as portions which extend beyond the ends of the counter do not need to be molded.

I claim:

1. That method of producing the upper portion of the heel part of a shoe which consists in providing similarly shaped, flat, upper, counter and lining pieces, assembling the counter between the upper and lining with an interposed yieldable adhesive over the entire contacting surfaces thereof, and with their top edges in approximate coincidence and the bottom edge portions of the upper and lining overlapping the bottom edge portion of the counter, connecting all of said pieces by a row of stitches extending close to said top edge, securing the bottom edge portions of said pieces against relative displacement by pressing them together and forming a series of transverse indentations therein, and then simultaneously molding all of said pieces to conform to the sides of a last and bending said bottom edge portions to form a bottom flange, to provide a flat heel seat.

2. That method of producing the upper portion of the heel part of a shoe which consists in providing similarly shaped upper, counter and lining pieces, assembling the counter between the upper and lining pieces with their top edges in approximate coincidence and the bottom edges of the upper and lining overlapping the bottom edge portion of the counter and connecting their surfaces by means of a yieldable adhesive which permits relative slipping of one on another during the subsequent molding operation, securing the bottom edge portions of said pieces against relative displacement by pressing them together and forming a series of transversely disposed indentations therein and then simultaneously molding all of said pieces to conform to the sides of a last and bending said bottom edge portions to provide a bottom flange for a heel seat.

3. That method of producing the upper portion of the heel part of a shoe which consists in providing similarly shaped upper, counter and lining pieces, assembling the counter between the upper and lining pieces with their top edges in approximate coincidence and the bottom edges of the upper and lining overlapping the bottom edge portion of the counter and connecting their surfaces by means of a yieldable adhesive which permits relative slipping of one on another during the subsequent molding operation, securing the bottom edge portions of said pieces against relative displacement by pressing them together and forming a series of transversely disposed indentations therein and then simultaneously molding all of said pieces to conform to the sides of a last and, at the same time, by successive molding operations, bending a portion of said bottom edge portions to provide a partial bottom flange and then bending the entire bottom portion to form a complete bottom flange for attachment of a heel.

4. That method of producing the upper portion of the heel part of a shoe which consists in providing upper, counter and lining pieces, assembling the counter between the upper and lining pieces, connecting their surfaces by means of a yieldable adhesive which permits relative slipping of one on another during the subsequent molding operation, securing the bottom edge portion of said pieces against relative displacement by pressing them together and then simultaneously molding all of said pieces to conform to the sides of a last and, at the same time, by successive molding operations, bending a portion of said bottom edge portion to provide a partial bottom flange and then bending the entire bottom portion to form a complete bottom flange for attachment of a heel.

5. That method of producing the upper portion of the heel part of a shoe which consists in providing upper, counter and lining pieces, assembling the counter between the upper and lining pieces, connecting their surfaces by means of a yieldable adhesive which permits relative slipping of one on another during the subsequent molding operation, securing the bottom edge portion of said pieces against relative displacement by pressing them together and forming a series of transversely disposed indentations therein, and then simultaneously molding all of said pieces to conform to the sides of a last and, at the same time, by successive molding operations, bending a portion of said bottom edge portions to provide a partial bottom flange and then bending the entire bottom portion to form a complete bottom flange for attachment of a heel.

CHARLES A. THURSTON.